(12) United States Patent
Iyer

(10) Patent No.: US 6,907,268 B2
(45) Date of Patent: Jun. 14, 2005

(54) SYSTEM, METHOD, AND APPARATUS FOR PROVIDING HIGH-SPEED ACCESS TO DATA STORED AT A DIGITAL CELLULAR SWITCH

(75) Inventor: Gopal N. Iyer, Boca Raton, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 646 days.

(21) Appl. No.: 09/910,566

(22) Filed: Jul. 20, 2001

(65) Prior Publication Data

US 2003/0017850 A1 Jan. 23, 2003

(51) Int. Cl.[7] ............................ H04M 1/00; H04Q 7/24
(52) U.S. Cl. .................. 455/560; 455/550.1; 455/424; 455/423; 370/338; 370/428; 370/401
(58) Field of Search ................................ 455/500, 550, 455/424, 423, 550.1; 370/338, 428, 401

(56) References Cited

U.S. PATENT DOCUMENTS

| | | | | |
|---|---|---|---|---|
| 4,827,499 A | * | 5/1989 | Warty et al. ................. | 455/560 |
| 5,177,780 A | * | 1/1993 | Kasper et al. ............... | 455/413 |
| 5,519,760 A | * | 5/1996 | Borkowski et al. ........ | 455/404.2 |
| 5,854,894 A | * | 12/1998 | Lancaster et al. ........... | 709/219 |
| 6,023,624 A | * | 2/2000 | Hanson ....................... | 455/458 |
| 6,079,017 A | * | 6/2000 | Han et al. ....................... | 713/2 |
| 6,185,439 B1 | * | 2/2001 | Guerrero et al. ............ | 455/560 |
| 6,324,272 B1 | * | 11/2001 | Abu-Shukhaidem et al. .... | 379/142.06 |

* cited by examiner

*Primary Examiner*—Sonny Trinh
*Assistant Examiner*—Huy Phan
(74) *Attorney, Agent, or Firm*—Merchant & Gould

(57) ABSTRACT

A system, method, and apparatus for facilitating high-speed access to data files stored at a digital cellular switch is provided. A digital cellular switch is provided that is capable of receiving and processing communications via a digital control interface. An operations and maintenance platform processor is also provided that is capable of communicating with the digital cellular switch via the digital control interface. The operations and maintenance platform processor includes software applications that allow a user to login to the operations and maintenance platform processor and execute commands. Once logged into the operations and maintenance platform processor, a user may execute application programs for transferring data files to and from the digital cellular switch over the digital control interface.

6 Claims, 5 Drawing Sheets

SYSTEM, METHOD, AND APPARATUS FOR PROVIDING HIGH-SPEED ACCESS TO DATA STORED AT A DIGITAL CELLULAR SWITCH

TECHNICAL FIELD

The present invention generally relates to the field of wireless cellular telecommunications. More specifically, the present invention relates to a method, system, and apparatus for providing high-speed access to data stored at a digital cellular switch.

BACKGROUND OF THE INVENTION

The LUCENT TECHNOLOGIES AUTOPLEX CELLULAR TELECOMMUNICATIONS SYSTEM-1000 is a complete wireless telecommunications system. The major components of the AUTOPLEX SYSTEM-1000 include an executive cellular processor, an operations and maintenance platform processor ("OMP"), a 5ESS-2000 digital cellular switch ("DCS"), and one or more cell sites. The 5ESS-2000 DCS is a multi-service, software-based, packet ready switching system that provides standard mobile switching center functionality.

During the normal operation of a 5ESS-2000 DCS, a number of data files are stored and utilized. For instance, the 5ESS-2000 DCS may utilize and store data files regarding the trunks, lines, multilane hunt groups, digital subscriber lines ("DSL"), and other types of data files that may include information necessary to the operation of the switch. However, due to the processing limitations of the 5ESS-2000 DCS, the contents of these data files cannot be effectively analyzed while they are stored at the switch. Therefore, in order to perform meaningful processing on the data files stored at a 5ESS-2000 DCS, these files must be transferred to a computer system external to the switch.

Previous methods for transferring data files to and from a DCS, such as the 5ESS-2000, suffer from a number of serious drawbacks. One such method requires connecting to the 5ESS-2000 over a standard telephone line using a personal computer. In particular, the personal computer is equipped with terminal emulation software, such as PROCOMM PLUS from SYMANTEC Corporation, and a standard telephone modem. The PROCOMM PLUS terminal emulator is utilized to establish a connection via the telephone modem and a standard telephone line to a network terminal server connected to the 5ESS-2000. Once a connection has been established, commands can be executed on the switch that cause the switch to effectively print the contents of the desired file to the terminal emulation screen. The PROCOMM PLUS terminal emulator can then be used to capture the file contents as they are streamed by the 5ESS-2000 switch. Once the file contents have been captured, they may be saved and processed at the personal computer or other computer system.

Capturing data sent from the 5ESS-2000 DCS using terminal emulation software and a personal computer as described above is problematic because there is no error detection or correction available when capturing a stream of data. Because of this, errors can be introduced into the captured data that may be undetectable. Moreover, because of the slow connection speeds of standard modems, large data files stored in the 5ESS-2000 switch may take hours, or even tens of hours, to transfer.

Accordingly, in light of the above, there is a need for a system, method and apparatus for providing high-speed access to data stored at a DCS, such as the 5ESS-2000 DCS. Moreover, there is a need for a system, method and apparatus for providing high-speed access to data stored at a DCS that can transfer data files stored at the DCS to another computer system using error detection and correction protocols.

SUMMARY OF THE INVENTION

The present invention solves the above-described problems by providing a system, method, and apparatus for accessing a data file stored at a DCS over a high-speed, error corrected, digital control interface. By accessing data files stored at a DCS through a digital control interface ("DCI") files may be transferred much faster and more precisely than possible with previous methods and systems for file transfer.

Generally described, the present invention comprises a system for providing high-speed access to data files stored at a DCS, such as the 5ESS-2000 DCS from LUCENT TECHNOLOGIES. According to one actual embodiment of the present invention, a system is provided that comprises a DCS capable of receiving and processing communications via a DCI link. An OMP is also provided that is capable of communicating with the DCS via the DCI link. The OMP includes software applications that allow a user to login to the OMP and execute commands. Once logged into the OMP, a user may execute application programs on the OMP for transferring data files to and from the DCS over the DCI link. Because the DCI comprises a high-capacity interprocessor communications channel between the DCS and the OMP, data files may be transferred quickly using error-corrected protocols.

According to another embodiment of the present invention, a method is provided for retrieving a data file stored at a DCS. According to an actual embodiment of the provided method, a request is received at an OMP for a data file stored at a DCS. In response to the file request, a request is transmitted for the data file from the OMP to the DCS via a DCI link. In response to the receiving the request at the DCS, the data file is transferred from the DCS to the OMP via the DCI link. In an actual embodiment of the present invention, a method is also provided for similarly sending a file from an OMP to a DCS via a DCI link. A computer-readable medium is also provided comprising computer-executable instructions for performing these methods.

In yet another actual embodiment of the present invention, an apparatus for providing high-speed access to data files stored at a DCS is provided. The apparatus provided in this embodiment of the present invention comprises a processor, a memory, and a DCI coupled to the processor. The DCI is operative to provide a communications link between the apparatus and a DCS. The apparatus also comprises a software component stored in the memory and capable of being executed on the processor that receives a request for a data file stored at the DCS and, in response to the request, retrieves the data file from the DCS via the DCI. The software component may also provide facilities for transmitting a file to the DCS in a similar manner.

DETAILED DESCRIPTION OF AN ILLUSRTATIVE EMBODIMENT

As described briefly above, the present invention provides a method, system, and apparatus for providing high-speed access to data stored at a DCS. According to an actual embodiment of the present invention, an OMP is provided that is equipped with a DCI for communicating with a DCS. The OMP is also equipped with a software component for allowing users to remotely gain access to the facilities of the OMP. Once logged into the OMP, a user can request that a data file be transferred from the DCS to the OMP or from the OMP to the DCS. In response to such a request, the OMP causes the data file to be transferred via the DCI link. Additional aspects of the present invention will be apparent from the detailed description that follows.

Figure 1:
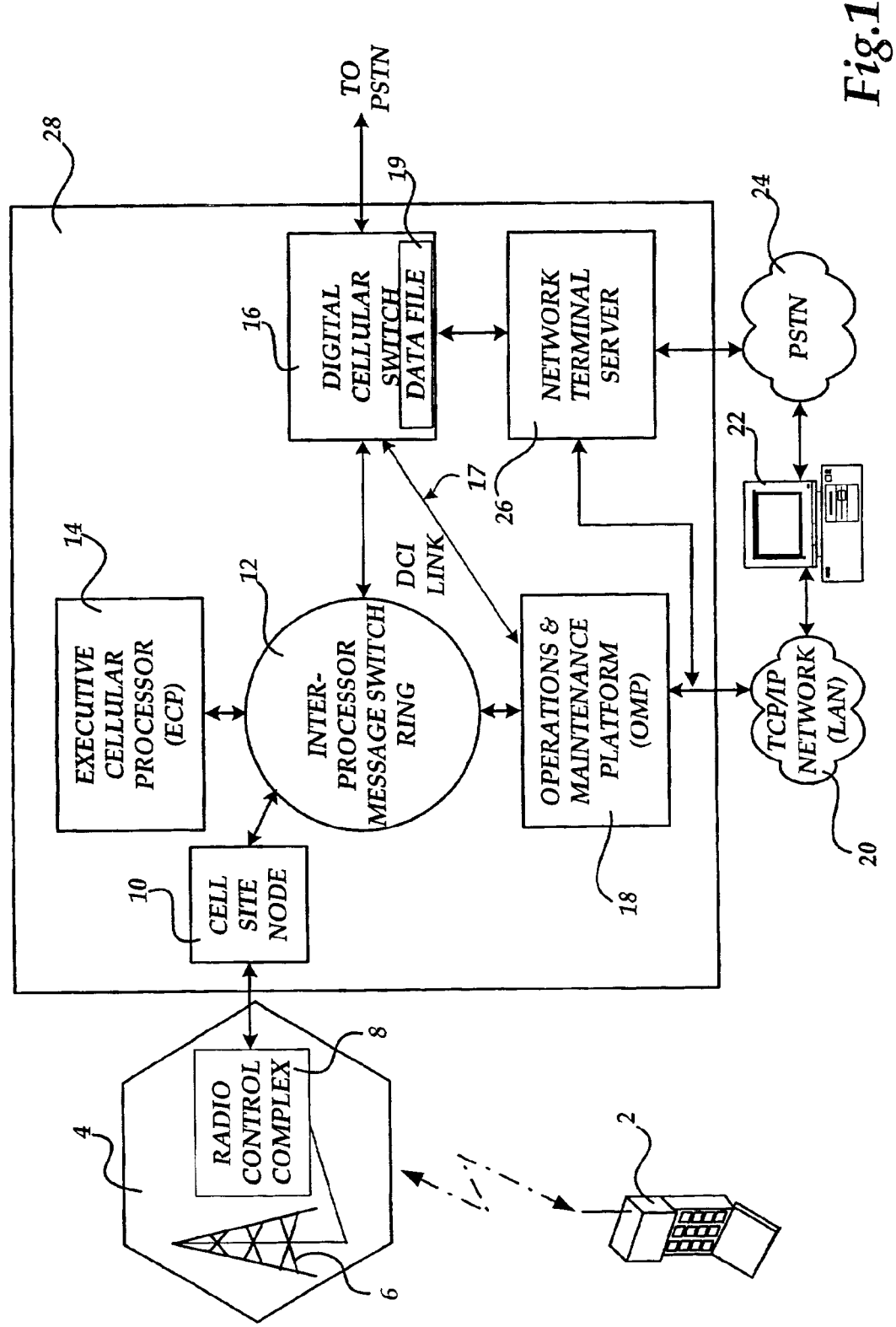
FIG. 1 is a block diagram illustrating a wireless cellular telecommunications system that comprises an operating environment for an actual embodiment of the present invention.

Referring now to the figures, in which like numerals represent like elements, an actual embodiment of the present invention will be described. FIG. 1 shows a digital switching network that provides an operating environment for aspects of the present invention. In particular, the digital switching environment includes a mobile switching center ("MSC") 28. As known to those skilled in the art, the MSC 28 communicates via a plurality of voice paths (not shown) and a control link with a cell site or base station 4. The cell site 4 in turn communicates by radio with a cellular mobile telephone unit ("MTU") 2. Inside the cell site 4 is a radio control complex 8 connected to an antenna 6 for communicating with the MTU 2 via radio signals.

The MSC 28 in the actual embodiment of the present invention described herein comprises an AUTOPLEX CELLULAR TELECOMMUNICATIONS SYSTEM-1000 from LUCENT TECHNOLOGIES. As known to those skilled in the art, the MSC 28 comprises an inter-processor message switch ring ("IMS ring") 12 for interconnecting the primary operating units of the MSC 28. A cell site node 10 is connected to the IMS ring 12 for transmitting data to the MTU 2, such as a page. The MSC 28 also includes an executive cellular processor ("ECP") 14, such as the 3B30D processor from LUCENT TECHNOLOGIES. The ECP 14 is a fully duplexed, fault-tolerant computer that provides processing and controlling functions for the MSC 28.

Also connected to the IMS ring 12 is a DCS 16. In the actual embodiment of the present invention described herein, the DCS comprises a 5ESS-2000 switch, also from LUCENT TECHNOLOGIES. The DCS 16 has voice channel connections (not shown) to the cell site 4 controlled by the MSC 28. The DCS 16 also has connections to the public switched telephone network 24 ("PSTN") for communicating with land-based telephone lines or other mobile switching centers. As a part of its normal operation, the DCS 16 may utilize and store one or more data files 19. For instance, the DCS 16 may store data files 19 containing data regarding the voice trunks to which the switch is connected, configuration data, or other types of data.

The DCS 16 may also be connected to a network terminal server 26. The network terminal server 26 is connected to the PSTN 24 and provides facilities for allowing a remote computer 22 to connect to the DCS 16. However, as described above, connections to the DCS 16 through the PSTN 24 and the network terminal server 26 are slow and cannot be utilized with error-corrected protocols.

According to the actual embodiment of the present invention described herein, an OMP 18 is also connected to the IMS ring 12. As known to those skilled in the art, the OMP 18 is typically utilized to resolve network problems without interruptions to call handling. The OMP 18 has its own memory, processor, and input/output facilities. The OMP 18 is also connected to a transmission control protocol/Internet protocol ("TCP/IP") network 20 and may be remotely accessed from the remote computer 22 via the TCP/IP network 20. As known to those skilled in the art, TCP/IP is a protocol for communication between computers and is used as a standard for transmitting data over networks, such as the Internet.

According to the actual embodiment of the present invention described herein, the OMP 18 also comprises a digital control interface. The digital control interface provides high-speed inter-processor communications with the DCS 16 via the DCI link 17. The physical connector utilized by the DCI link 17 comprises a pair of dual series channel cables. As will be described in greater detail below, the DCI link 17 is utilized by the OMP 18 to transfer files to and from the DCS 16 at high speeds and using error-corrected protocols. Additional details regarding the hardware and software that comprises the OMP 18 will be described below with respect to FIGS. 3–5.

Figure 2:
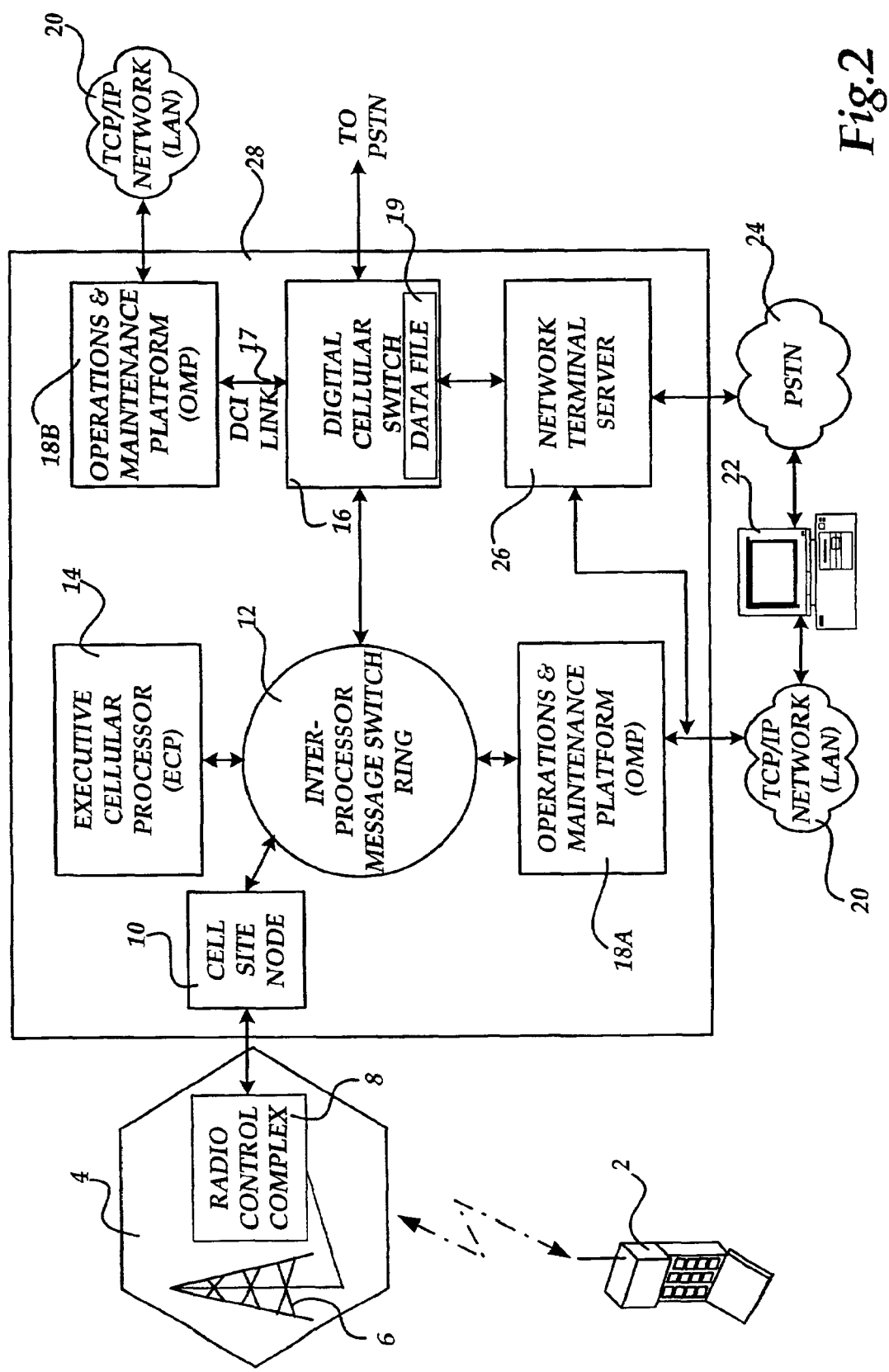
FIG. 2 is a block diagram illustrating a second wireless cellular telecommunications system that comprises an operating environment for another actual embodiment of the present invention.

Referring now to FIG. 2, another actual embodiment of the present invention will be described. The operating environment for this embodiment of the present invention includes all of the components described above with respect to FIG. 1, including an MSC 28 and a cell site 4. This actual embodiment of the present invention also utilizes an OMP 18A exclusively for performing maintenance and management procedures on the DCS 16.

The embodiment of the present invention illustrated in FIG. 2 also includes a second OMP 18B that is dedicated to providing facilities for transferring files to and from the DCS 16. In particular, the OMP 18B is connected to the DCS 16 via a DCI link 17. Additionally, the OMP 18B is connected to the TCP/IP network 20. A personal computer, such as the remote computer 20, may gain access to the OMP 18B through the TCP/IP network 20. Once access to the OMP 18B has been gained, commands can be executed on the OMP 18B to cause files to be transferred to and from the DCS 16 via the DCI link 17. Additional details regarding the architecture and the operation of the OMP 18B are described below with respect to FIGS. 3–5.

Figure 3:
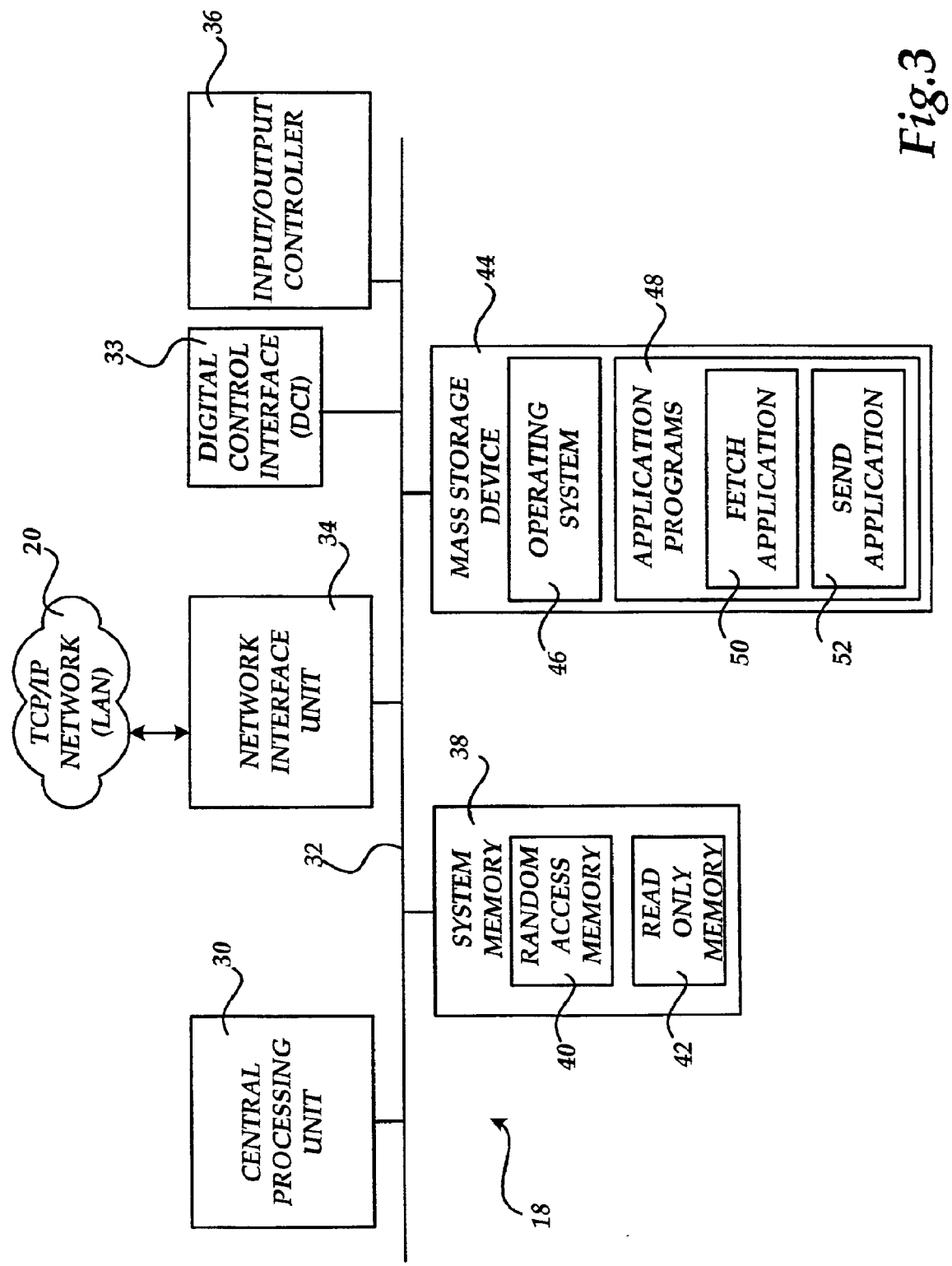
FIG. 3 is a block diagram illustrating a computer architecture for an OMP provided in an actual embodiment of the present invention.

Turning now to FIG. 3, an illustrative computer architecture for the OMP 18 will be described. The computer architecture shown in FIG. 3 illustrates a conventional network server computer, including a central processing unit 30 ("CPU"), a system memory 38, including a random access memory 40 ("RAM") and a read-only memory ("ROM") 42, and a system bus 32 that couples the memory to the CPU 30. A basic input/output system ("BIOS") containing the basic routines that help to transfer information between elements within the computer, such as during startup, is stored in the ROM 42. The computer further includes a mass storage device 44 for storing an operating system 46 and application programs 48.

The mass storage device 44 is connected to the CPU 30 through a mass storage controller (not shown) connected to the bus 32. The mass storage device 44 and its associated computer-readable media, provide non-volatile storage for the operations and maintenance platform processor 18. Although the description of computer-readable media contained herein refers to a mass storage device, such as a hard disk or CD-ROM drive, it should be appreciated by those skilled in the art that computer-readable media can be any available media that can be accessed by the OMP 18.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described briefly above, the OMP 18 may operate in a networked environment using logical connections to a remote computer 22 through a TCP/IP network 20. The operations and maintenance platform processor 18 may connect to the TCP/IP network 20 through a network interface unit 34 connected to the bus 32. The operations and maintenance platform processor 18 may also include an input/output controller 36 for receiving and processing input from a number of devices, including a keyboard or mouse. Similarly, the input/output controller 36 may provide output to a display screen, a printer, or other type of output device. Additionally, the OMP 18 includes a digital control interface 33 for communicating with a DCS 16 via a DCI link 17.

A number of program modules may be stored in the mass storage device 44 and RAM 40 of the OMP 18, including an operating system 46 suitable for controlling the operation of a networked server computer, such as the UNIX operating system or the WINDOWS NT operating system from MICROSOFT CORPORATION of Redmond, Wash. The mass storage device 44 and RAM 42 may also store one or more application programs 48. In particular, the mass storage device 44 and RAM 42 may store a fetch application 50 and a send application 52. The fetch application 50 is operative to retrieve data files from the DCS 16 via the DCI link 17. The send application 50 is operative to send data files to the DCS 16 via the DCI link 17. Additional details regarding the operation of the fetch application 50 and the send application 52 are described below with reference to FIGS. 4 and 5, respectively.

Figure 4:
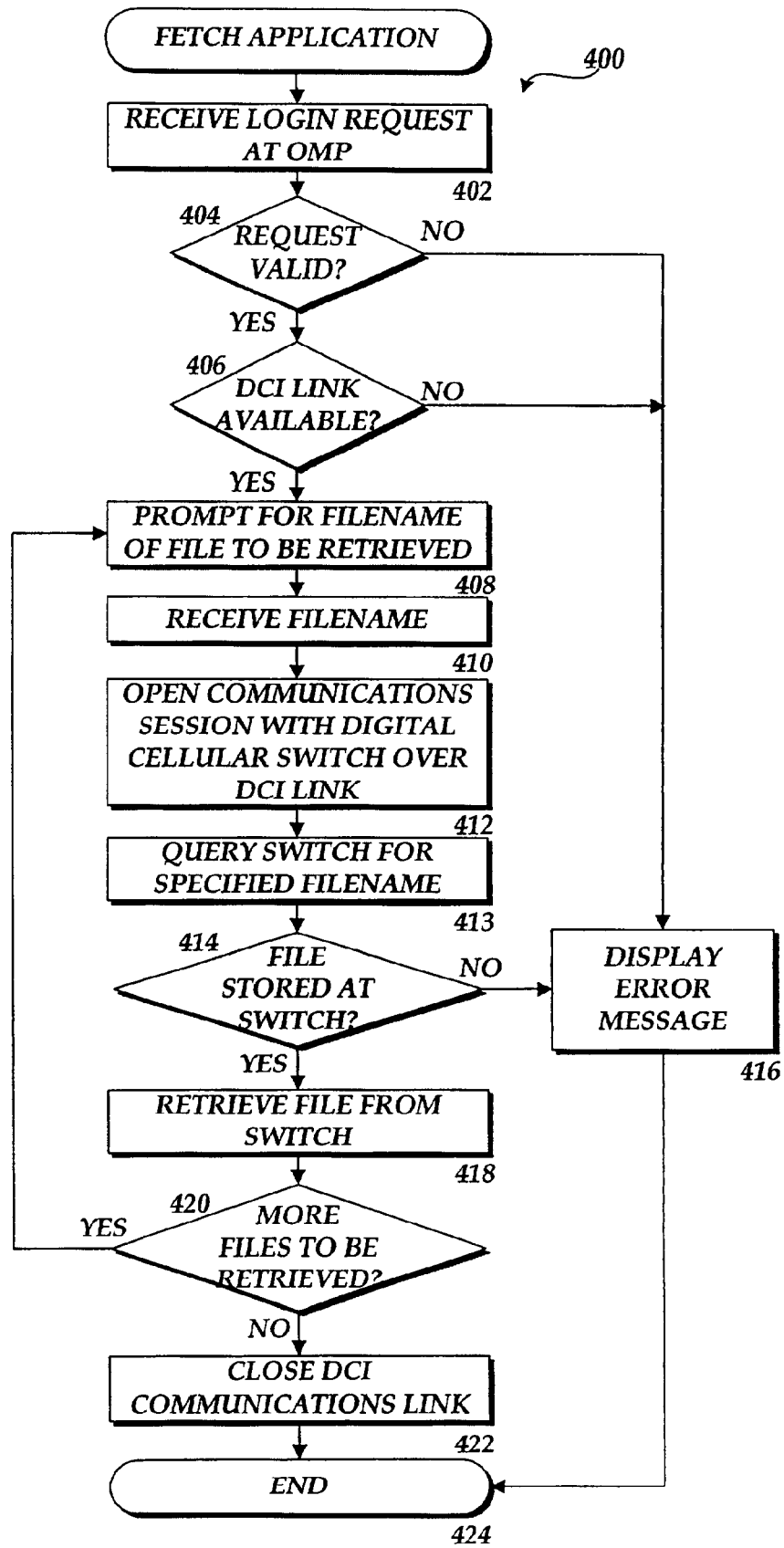
FIG. 4 is a flow diagram illustrating a routine for fetching a data file from a DCS in an actual embodiment of the present invention.

Referring now to FIG. 4, a Routine 400 will be described that illustrates the operation of the fetch application 50. As described briefly above, the fetch application 50 executes on the OMP 18 and is utilized to retrieve, or fetch, a data file located at a DCS via a DCI link 17. In the actual embodiment of the present invention described herein, the fetch application 50 comprises a version of the 3BFETCH application available from LUCENT TECHNOLOGIES that has been modified to communicate with a DCS 16 via a DCI link 17. Those skilled in art should appreciate, however, that a new, stand-alone application may also be created that provides similar functionality.

The Routine 400 begins at block 402, where a login request is received at the OMP 18 that may include a login name and password. From block 402, the Routine 400 continues to block 404, where the OMP 18 determines if the login request is valid. If the login request is not valid, the Routine 400 branches to block 416, where an error message is provided. The Routine 400 then continues to block 424, where it ends.

If, at block 404, the OMP 18 determines that the login request is valid, the Routine 400 continues to block 406, where a determination is made at the OMP 18 as to whether a DCI link is available for communicating with the DCS 16. If a DCI link is not available for communicating with the DCS 16, the Routine 400 branches to block 416, where an error message is provided. The Routine 400 then continues from block 416 to block 424, where it ends.

If, at block 406, the OMP 18 determines that a DCI link is available for communicating with the DCS 16, the Routine 400 continues to block 408. At block 408, a prompt is provided to the user for a filename of the data file to be retrieved from the DCS 16. The Routine 400 then continues to block 410, where the filename of the data file to be retrieved is received from the user.

From block 410, the Routine 400 continues to block 412, where a communications session is opened between the OMP 18 and the DCS 16 over the DCI link 17. The Routine 400 then continues to block 413, where the OMP 18 queries the DCS 16 for the specified filename. At block 414, a determination is made at the DCS 16 as to whether the specified filename is stored at the DCS 16. If no file with the provided filename is stored at the DCS 16, a message is transmitted from the DCS 16 to the OMP 18 indicated that the file does not exist. The Routine 400 then branches to block 416, where an error message is provided. From block 416, the Routine 400 continues to block 416, where it ends.

If, at block 414, the DCS 16 determines that the specified filename is stored at the DCS 16, the Routine 400 continues to block 418. At block 418, the data file specified by the filename is transferred from the DCS 16 to the OMP 18 via the DCI link 17. As described above, error-correcting protocols may be utilized during this file transfer. Once the file transfer has been completed, the data file is stored at the OMP 18. The Routine 400 then continues to block 420, where the OMP 18 determines if additional data files are to be transferred from the DCS 16. If additional files are to be transferred, the Routine 400 returns to block 408 and the above-described process is repeated. If no additional files are to be transferred, the Routine 400 continues from block 420 to block 422 where communication over the DCI link 17 is closed. The Routine 400 continues from block 422 to block 424, where it ends.

Figure 5:
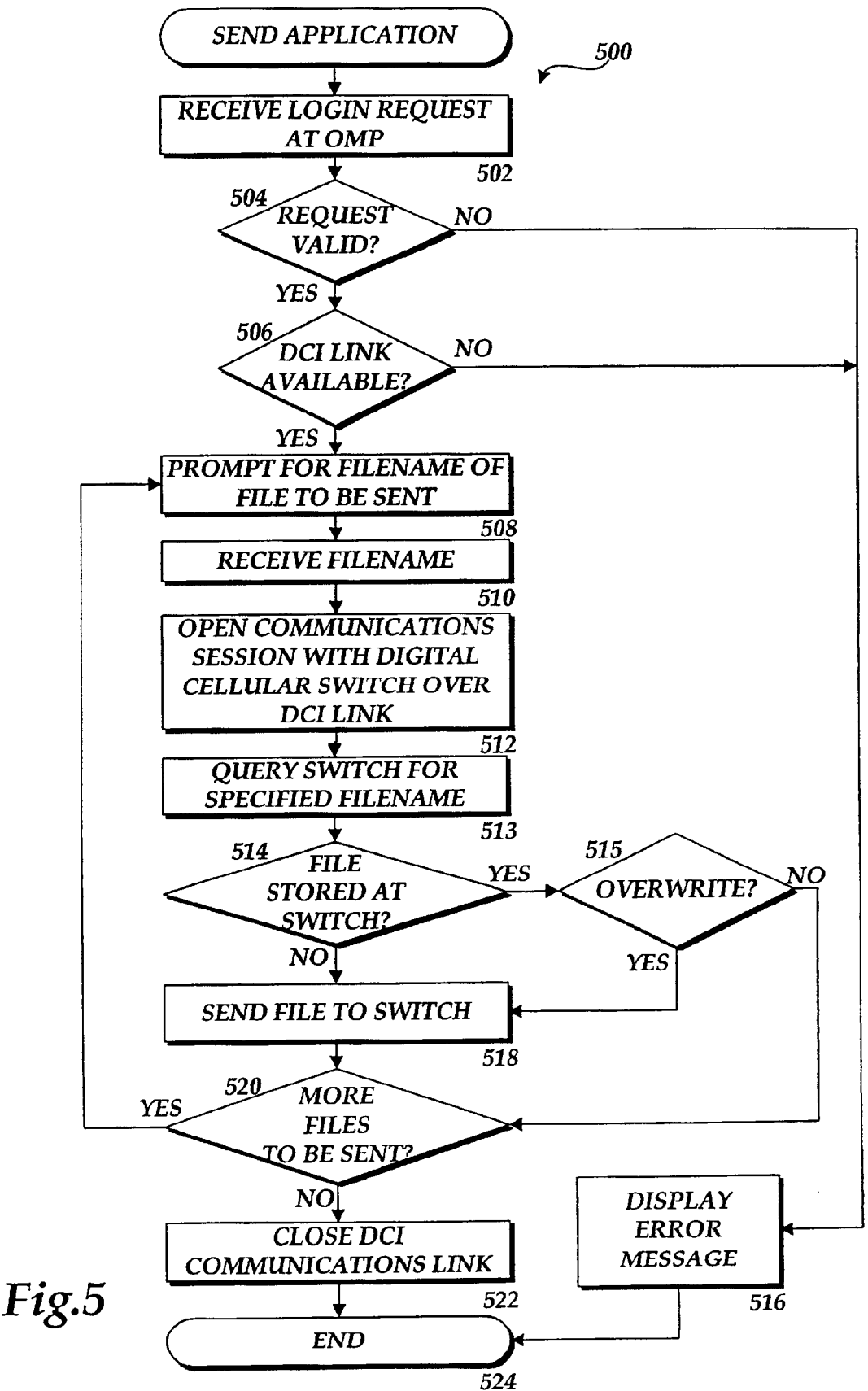
FIG. 5 is a flow diagram illustrating a routine for sending a data file to a DCS in an actual embodiment of the present invention.

Turning now to FIG. 5, a Routine 500 will be described that illustrates the operation of the send application 52. As described briefly above, the send application 52 is utilized to transmit a data file from the OMP 18 to a DCS 16 via the DCI link 17. In the actual embodiment of the present invention described herein, the send application 52 comprises a version of the 3BSEND application available from LUCENT TECHNOLOGIES that has been modified to communicate with a DCS via a DCI link. Those skilled in art should appreciate, however, that a new, stand-alone application may also be created that provides similar functionality.

The Routine 500 begins at block 502, where a login request is received at the OMP 18 that may include a login name and password. From block 502, the Routine 500 continues to block 504, where the OMP 18 determines if the login request is valid. If the login request is not valid, the Routine 500 branches to block 516, where an error message is provided indicating that the login request is invalid. The Routine 500 then continues to block 524, where it ends. If, at block 504, the OMP 18 determines that the login request is valid, the Routine 500 continues to block 506, where a determination is made at the OMP 18 as to whether the DCI link 17 is available for communicating with the DCS 16. If the DCI link 17 is not available for communicating with the DCS 16, the Routine 500 branches to block 516, where an error message is provided indicating that the DCI link 17 is unavailable. The Routine 500 then continues from block 516 to block 524, where it ends.

If, at block 506, the OMP 18 determines that a DCI link 17 is available for communicating with the DCS 16, the Routine 500 continues to block 508. At block 508, a prompt is provided to the user for a filename of the data file to be sent to the DCS 16. The Routine 500 then continues to block 510, where the filename of the data file to be sent is received from the user. From block 510, the Routine 500 continues to block 512, where a communications session is opened between the OMP 18 and the DCS 16 over the DCI link 17. The Routine 500 then continues to block 513, where the OMP 18 queries the DCS 16 for the specified filename. At block 514, a determination is made at the DCS 16 as to whether the specified filename is stored at the switch. If a filename is stored at the DCS 16 with the provided filename, the Routine 500 branches to block 515. At block 515, a determination is made at the DCS 16 as to whether the existing data file should be overwritten. If the file should be overwritten, the Routine 500 branches from block 515 to block 518, where the data file is transmitted to the DCS 16 and the existing file is overwritten. If the existing file should not be overwritten, the Routine 500 branches from block 515 to block 520.

If, at block 514, the DCS 16 determines that the specified filename is not stored at the DCS 16, the Routine 500 continues to block 518 where the data file specified by the filename is transferred from the OMP 18 to the DCS 16 via the DCI link 17. As described above, error-correcting protocols may be utilized during this file transfer. Once the file transfer has been completed, the data file is stored at the DCS 16. The Routine 500 then continues from block 518 to block 520, where the OMP 18 determines if additional data files are to be transferred to the DCS 16. If additional files are to be transferred, the Routine 500 returns to block 508 and the above-described process is repeated. If no additional files are to be transferred, the Routine 500 continues from block 520 to block 522 where communications over the DCI link 17 are closed. The Routine 500 then continues from block 522 to block 524, where it ends.

Based upon the foregoing, it should be appreciated that the present invention provides a system, method, apparatus, and computer-readable medium for providing high-speed access to data files stored at a DCS. The above specification, examples, and data provide a complete description of the manufacture and use of the composition of the invention. Because many embodiments of the invention can be made without departing from the spirit and scope of the invention, the invention is defined by the claims hereinafter appended.

What is claimed is:

1. A method for retrieving a data file stored at a digital cellular switch, comprising:

receiving a request at an operations and maintenance platform processor for said data file stored at said digital cellular switch;

transmitting a request for said data file from said operations and maintenance platform processor to said digital cellular switch via a digital control interface communications link;

in response to said request, receiving said file at said operations and maintenance platform processor from said digital cellular switch via said digital control interface communications link; and determining whether said digital control interface communications link is available to provide a communications link between said digital cellular switch and said operations and maintenance platform processor prior to transmitting said request.

2. The method of claim 1, further comprising providing a prompt for a filename identifying said data file.

3. The method of claim 2, further comprising receiving said filename and transmitting said filename as a part of said request.

4. A method for storing a data file at a digital cellular switch, comprising:

receiving a request at an operations and maintenance platform processor to store said data file at said digital cellular switch;

in response to said request, transmitting said file from said operations and maintenance platform processor to said digital cellular switch via said digital control interface communications link; and determining whether said digital control interface communications link is available to provide a communications link between said digital cellular switch and said operations and maintenance platform processor prior to transmitting said data file.

5. The method of claim 4, further comprising providing a prompt for a filename identifying said data file.

6. The method of claim 5, further comprising receiving said filename and transmitting said filename to said digital cellular switch prior to transmitting said data file.

* * * * *